United States Patent [19]
Kadota et al.

[11] Patent Number: 5,788,577
[45] Date of Patent: Aug. 4, 1998

[54] HOMOKINETIC UNIVERSAL JOINT HAVING DECREASED INDUCED THRUST

[75] Inventors: Tetsuro Kadota, Shizuoka-ken; Yoshimasa Ushioda, Iwata; Yukio Asahara; Hiroki Terada, both of Shizuoka-ken; Masaru Komatsu, Iwata; Hiroyuki Matsuoka, Kuwana, all of Japan

[73] Assignee: NTN Corporation, Osaka, Japan

[21] Appl. No.: 582,645

[22] Filed: Jan. 4, 1996

[30] Foreign Application Priority Data

| Feb. 27, 1995 | [JP] | Japan | 7-038552 |
| Apr. 25, 1995 | [JP] | Japan | 7-099182 |
| Nov. 9, 1995 | [JP] | Japan | 7-290800 |

[51] Int. Cl.⁶ ............................................. F16D 3/205
[52] U.S. Cl. ........................... 464/111; 464/124; 464/905
[58] Field of Search ....................... 464/111, 120, 464/123, 124, 132, 905

[56] References Cited

U.S. PATENT DOCUMENTS

| 4,578,048 | 3/1986 | Hirai et al. ........................ 464/905 X |
| 4,589,856 | 5/1986 | Mazziotti et al. . | |
| 4,971,595 | 11/1990 | Sasaki et al. ........................ 464/111 |
| 5,069,653 | 12/1991 | Mizukoshi ........................ 464/111 |
| 5,098,342 | 3/1992 | Mizukoshi ........................ 464/111 |
| 5,224,899 | 7/1993 | Turner et al. ........................ 464/111 |
| 5,362,275 | 11/1994 | Girguis ........................ 464/905 X |

FOREIGN PATENT DOCUMENTS

| 0 532 992 A3 | 3/1993 | European Pat. Off. . |
| 2 668 804 | 10/1991 | France . |
| 3936 603 A1 | 5/1991 | Germany . |
| 42 10894 A1 | 10/1993 | Germany . |
| 4407 346 A1 | 6/1995 | Germany . |
| 405010344 | 1/1993 | Japan ........................ 464/111 |
| 2195 167 | 3/1988 | United Kingdom . |
| 2 259 557 | 3/1993 | United Kingdom . |
| WO 95/23928 | 9/1995 | WIPO . |
| WO 95/31647 | 11/1995 | WIPO . |

*Primary Examiner*—Daniel P. Stodola
*Assistant Examiner*—Emmanuel M. Marcelo
*Attorney, Agent, or Firm*—Nikaido, Marmelstein, Murray & Oram LLP

[57] ABSTRACT

An inner roller is rotatably fitted on a trunnion of a tripod member through a plurality of needle rollers and held in position against slipping off the trunnion by a slip-off preventing ring and a stopper ring mounted on the distal end of the trunnion.

9 Claims, 7 Drawing Sheets

HOMOKINETIC UNIVERSAL JOINT HAVING DECREASED INDUCED THRUST

BACKGROUND OF THE INVENTION

The present invention relates to a homokinetic universal joint used for power transmission in automobiles and various industrial machines, and particularly to a tripod type homokinetic universal joint.

A tripod type homokinetic universal joint comprises a tripod member having three radially projecting trunnions disposed at circumferential intervals of 120°, and an outer ring having track grooves in which the three trunnions of said tripod member are fitted for integral rotation, the joint having features that even if two shafts take an operating angle, the torque is transmitted at homokinetic and that it allows axial relative displacement.

In homokinetic universal joints of this type, there is provided an arrangement wherein spherical rollers are rotatably fitted on the trunnions in order to decrease the frictional resistance between the trunnions and the track grooves. Recently, further improvements have been made to provide an arrangement, as shown in FIG. 8, wherein each trunnion 2a of a tripod member 2 has rotatably fitted thereon an inner roller 3' having a spherical outer surface and an outer roller 4' having a spherical outer surface and a cylindrical inner surface in linear contact with the outer surface of the inner roller 3'.

In the same figure, the outer ring 1 is in the form of a substantially cylindrical cup which is open at one end and closed at the other, wherein a shaft 5 is integrally installed at the other end and three axial track grooves 1a' are formed in the inner periphery at intervals of 120°. The tripod member 2 is fitted on a serrated portion (or splined portion) 6a formed on one end of a shaft 6 and held against slipping off between a step portion 6b and a clip 6c. The three trunnions 2a of the tripod member 2 are fitted in the track grooves 1a' of the outer ring 1. The torque transmission between the outer ring 1 and the tripod member 2 is effected through contact between the outer surfaces of the outer rollers 4' and the track grooves 1a'. For axial displacement of the outer ring 1 and the tripod member 2, the outer rollers 4' are guided along the track grooves 1a', and for angular displacement, the outer surfaces of the inner rollers 3' are guided along the inner surfaces of the outer rollers 4', ensuring smooth displacement.

The conventional arrangement shown in FIG. 8, in which the inner roller 3' and outer roller 4' are mounted on the trunnions 2a, is advantageous over the arrangements prior thereto in that the induced thrust is low which is produced during torque transmission with the outer ring 1 and the tripod member 2 taking an operating angle. The reason is that in a conventional arrangement in which spherical rollers are mounted on the trunnions, while taking an operating angle, the spherical rollers which make axial slide movement with inclination are in direct contact with the track grooves of the outer ring, the slide resistance is high, whereas in the arrangement shown in FIG. 8, since relative displacement is allowed between the inner rollers 3' and the outer rollers 4', the outer rollers 4' have only to make substantially constant axial movement alone along the track grooves 1a' of the outer ring 1, with the result that the thrust resistance is decreased.

In the conventional arrangement shown in FIG. 8 although the induced thrust is lower than that in prior arrangements, there has been a limit in further decreasing it. We have conducted experiments to investigate the cause and found that when the inner rollers 3' make inclination while contacting the inner surfaces of the outer rollers 4' when taking an operating angle, the outer rollers 4' also tend to follow the movement of the inner rollers 3' due to the frictional resistance therebetween. At this time, as shown enlarged in FIG. 9, the contact stresses increase which are produced in the area of contact A between the flange portion 1b' on the outer portion of the track groove 1a' of the outer ring 1 and the end surface 4c' of the outer roller 4' associated with the distal end of the trunnion and in the area of contact B between the inner portion (opposite to the flange) of the track groove 1a' on the non-loaded side of the outer ring 1, it being believed that the limitation is imposed by the fact that the rolling resistance of the outer rollers 4' increases owing to the frictional force produced in these areas of contact A and B.

SUMMARY OF THE INVENTION

Accordingly, an object of the present invention is to provide a tripod type homokinetic universal joint wherein the induced thrust which is produced during torque transmission between the outer ring and the tripod member taking an operating angle is further decreased, thus further decreasing vibration.

In a homokinetic universal joint according to claim 1, the inner surface of the outer roller is shaped such that a load component directed to the distal end of the trunnion is produced in the area of contact between it and the outer surface of the inner roller. This load component presses the outer roller toward the distal end of the trunnion, whereby, in the non-loaded region of the track groove of the outer ring, the contact stress produced in the area of contact on the inner side is decreased. As for such shape of the inner surface of the outer roller, it is possible to employ a conical taper surface gradually decreased in diameter toward the distal end of the trunnion a concave surface with the generatrix center located at a point offset toward the proximal end of the trunnion with respect to the generatrix center of the outer surface of the inner roller, a convex surface with the generatrix center located at a point offset toward the distal end of the trunnion with respect to the generatrix center of the outer surface of the inner roller, a composite surface comprising a conical taper surface gradually decreased in diameter toward the distal end of the trunnion and a convex surface, or a composite surface comprising cylindrical and convex surfaces.

In homokinetic universal joint according to the present invention the generatrix radius of the outer surface of the inner roller is smaller than the maximum radius of said outer surface. The contact oval in the area of contact between the outer surface of the inner roller and the inner surface of the outer roller becomes smaller, decreasing the frictional resistance in the area of contact, with the result that particularly the inclination of the outer roller during application of an operating angle is suppressed.

In another homokinetic universal joint according to present invention, the track grooves of the outer ring contact the outer surfaces of the outer rollers but do not contact the end surfaces of the outer rollers associated with the distal ends of the trunnions. During torque transmission between the outer ring and tripod member taking an operating angle, even if the outer rollers incline while following the displacement of the inner rollers, there is no contact stress produced between their end surfaces associated with the distal ends of the trunnions and the track grooves.

In a further homokinetic universal joint according to the present invention the portion of the outer roller associated with the distal end of the trunnion is widthwise expanded. When the outer rollers axially move while taking an operating angle along the track grooves, the inclination of the outer rollers is suppressed when the outer rollers follow the movement of the inner rollers.

In addition, two or more of the arrangements may be optionally combined.

Embodiments of the invention will now be described with reference to the accompanying drawings, in which.

DESCRIPTION OF PREFERRED EMBODIMENTS

Figure 8A:
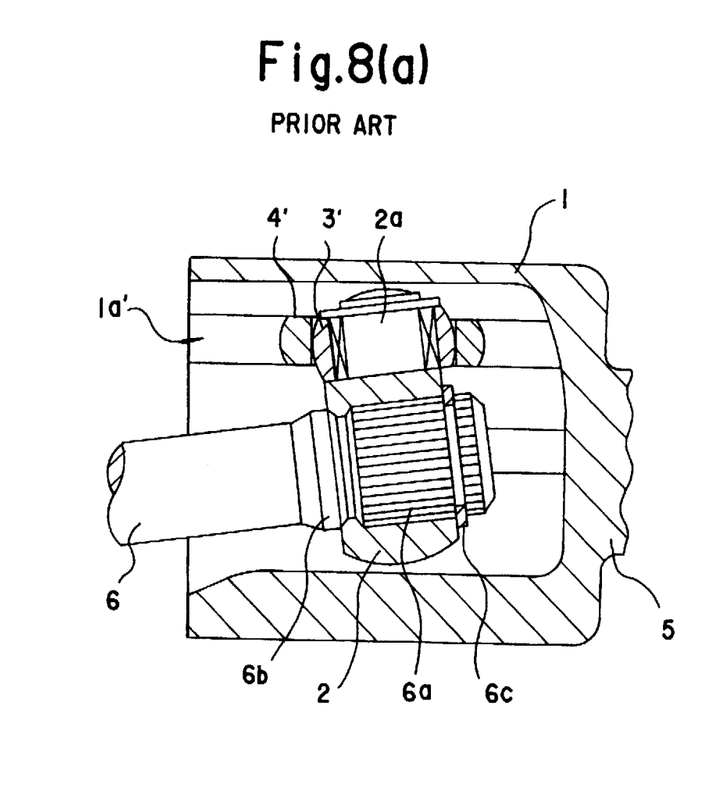
FIG. 8a is a longitudinal sectional view showing a conventional arrangement, and FIG. (8(b) is a cross-sectional view thereof.
Figure 8B:
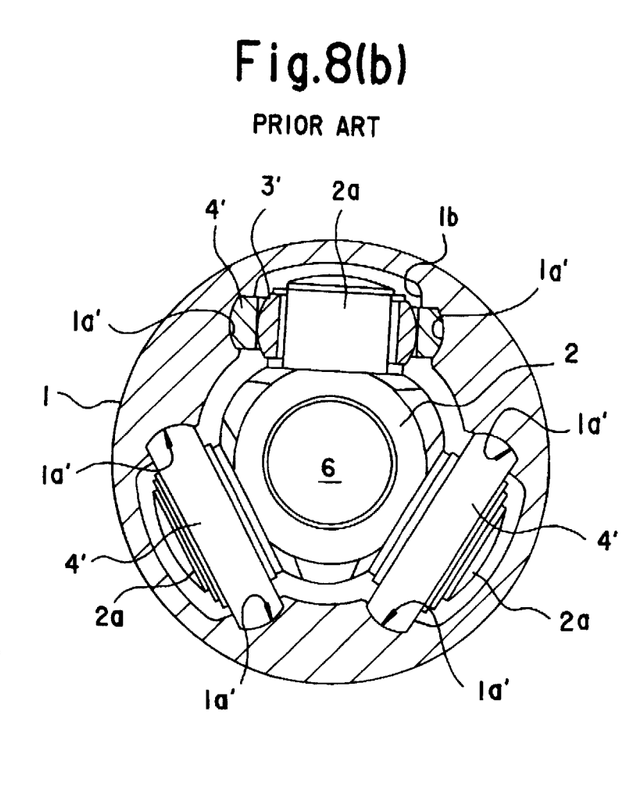
Figure 9:
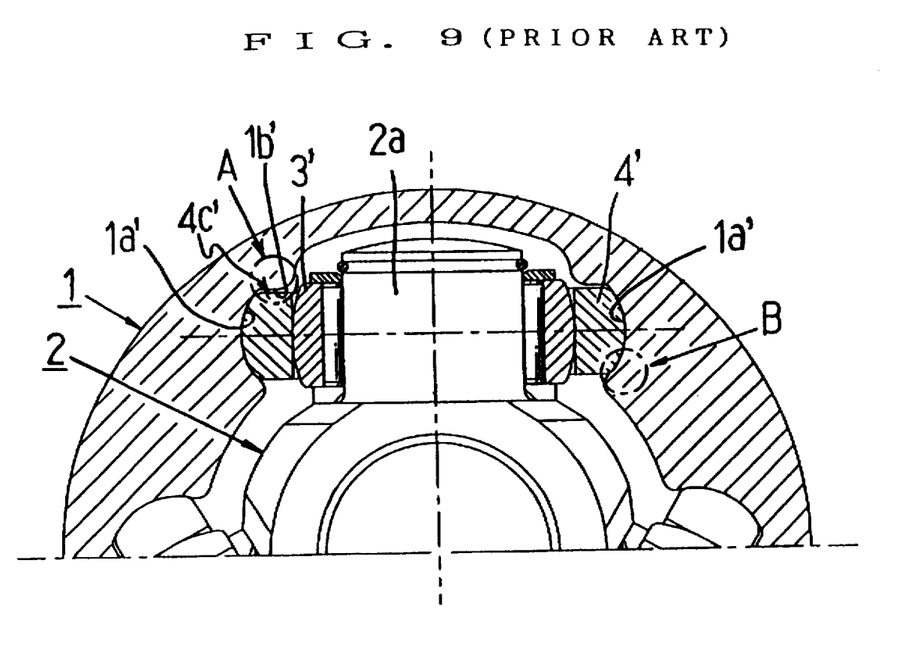
FIG. 9 is an enlarged cross-sectional view showing a peripheral portion of a trunnion in FIG. 3.

In the drawings, members and parts which are substantially the same as those in a conventional arrangement shown in FIGS. 8(a), 8(b) and 9 are denoted by the same reference characters to omit a repetitive description thereof.

Figure 1A:
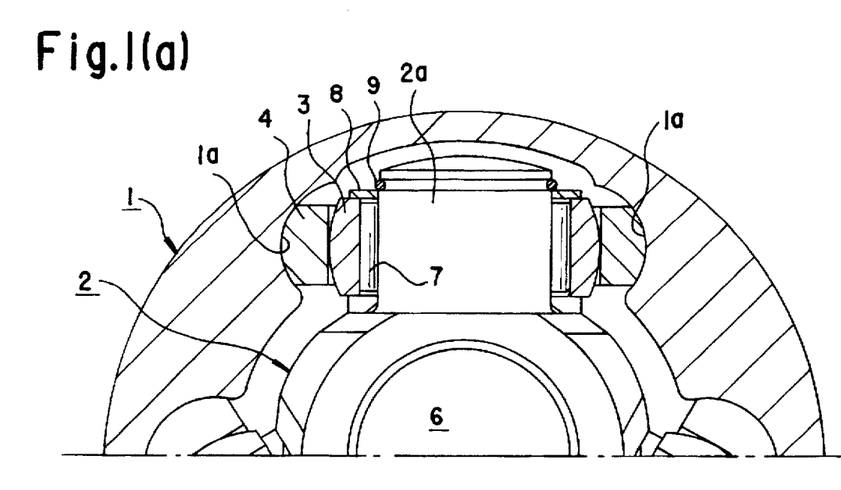
FIG. 1a is a cross-sectional view showing an embodiment.
Figure 1B:
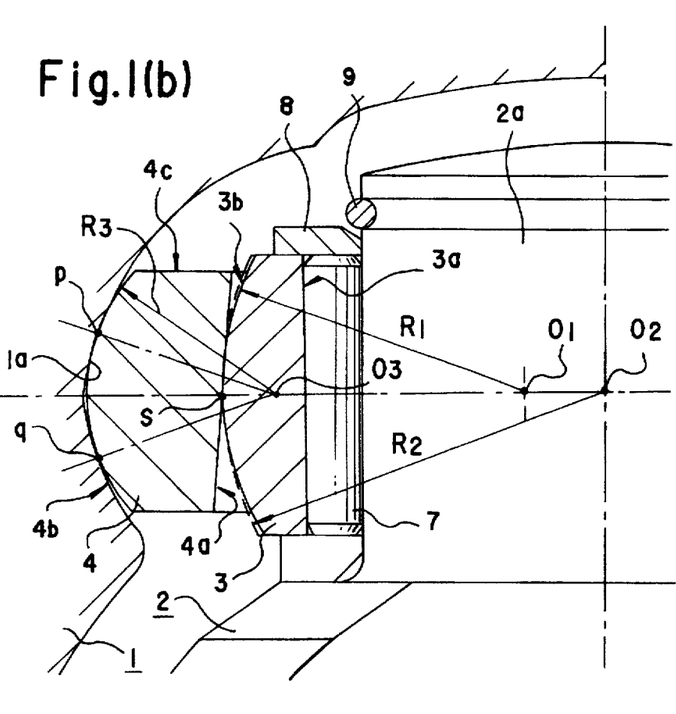
FIG. 1(b) is a partial enlarged cross-sectional view showing a peripheral portion of a track groove in the FIG. a, and FIG. 1(c) is a view showing a component of force produced in an area of contact between an inner roller and an outer roller.

As shown in FIG. 1a, an inner roller 3 is rotatably fitted on a trunnion 2a of a tripod member 2 through a plurality of needle rollers 7 and held in position against slipping off the trunnion 2a by a slip-off preventing ring 8 and a stopper ring 9 mounted on the distal end of the trunnion 2a. As shown in FIG. 1 (b), the inner surface 3a of the inner roller 3 is a cylindrical surface, and the outer surface 3b thereof is a spherical surface. In this embodiment, the generatrix of the outer surface 3b is an arc of radius R1 with the generatrix center disposed at a point 01 offset toward the radial outer side by a predetermined amount from the radius center 02 of the maximum radius R2 of the inner roller 3, the generatrix radius R1 being smaller than the maximum radius R2 of the outer surface 3b. The generatrix of the outer surface 3b is a circular arc line appears in the cross section of the inner roller 3 in FIG. 1(b). Thus, in this specification, the word "generatrix" means a line appears in the cross section in FIG. 1–FIG. 6.

An outer roller 4 is rotatably fitted on the outer surface 3b of the inner roller 3. In this embodiment, the inner surface 4a of the outer roller 4 is a conical taper surface gradually decreased in diameter toward the distal end of the trunnion 2a and, therefore, the inner surface 4a and the outer surface 3b of the outer roller 3 are in linear contact with each other and hence relative displacement between them is permitted. In addition, the conical taper angle of the inner surface 4a is preferably 0.1–3 degrees, for example. The outer surface 4b of the outer roller 4 is a spherical surface of generatrix radius R3 with the generatrix center disposed at a point 03.

The track groove 1a of the outer ring 1 is depicted substantially V-shaped or double-spherically shaped (Gothic arch-shaped), but unlike the conventional arrangement shown in FIGS. 8 and 9, there is no flange on its outer side (that is, the side of the groove the farthest radially outward of an axis of the ring). As a result, the track groove 1a makes angular contact at two points p and q with the outer surface 4b of the outer roller 4, not with the axial end surface 4c of the outer roller 4 associated with the distal end of the trunnion.

The homokinetic universal joint of this embodiment has the arrangement described above, whereby the induced thrust is decreased as follows.

That is, (1) the shape is such that the track groove 1a of the outer ring 1 makes angular contact at two points p and q with the outer surface 4b of the outer roller 4 and does not make contact with the end surface 4c of the outer roller 4 associated with the distal end of the trunnion. Therefore, when torque is transmitted between the outer ring 1 and the tripod member 2 taking an operating angle, even if the outer roller 4 is inclined as it follows the displacement of the inner roller 3, there will be no contact stress produced between the end surface 4c and the track groove 1a. Therefore, as compared with the conventional arrangement, the axial slide resistance is decreased and so is the induced thrust.

Figure 1C:
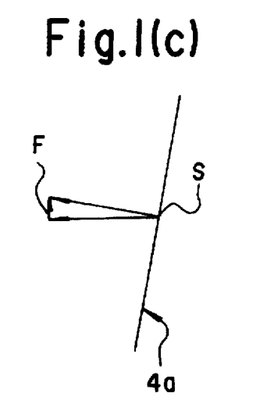

Further, since the inner surface 4a of the outer roller 4 is a conical taper surface gradually decreased in diameter toward the distal end of the trunnion, (2) a component of force F is produced in the area of contact S between the inner surface 4a and the outer surface 3b of the inner roller 3, pressing the outer roller 4 toward the distal end of the trunnion (see FIG. 1 (c)). Because of this force component F, in the region of the track groove 1a on the non-loaded side of the outer ring 1, the contact stress produced in the contact area on the radially inner side of the grooves in the ring (the portion B shown in the FIG. 9) is decreased. As a result, as compared with the conventional arrangement, the axial slide resistance is decreased and so is the induced thrust.

Further, (3) since the generatrix radius R1 of the outer surface 3b of the inner roller 3 is smaller than the maximum radius R2, the contact oval in the area of contact S between the outer surface 3b of the inner roller 3 and the inner surface 4a of the outer roller 4 becomes smaller, decreasing the frictional resistance in the area of contact S, with the result that particularly the inclination of the outer ring 4 during application of an operating angle is suppressed. As a result, as compared with the conventional arrangement, the axial slide resistance is decreased and so is the induced thrust.

Figure 2A:
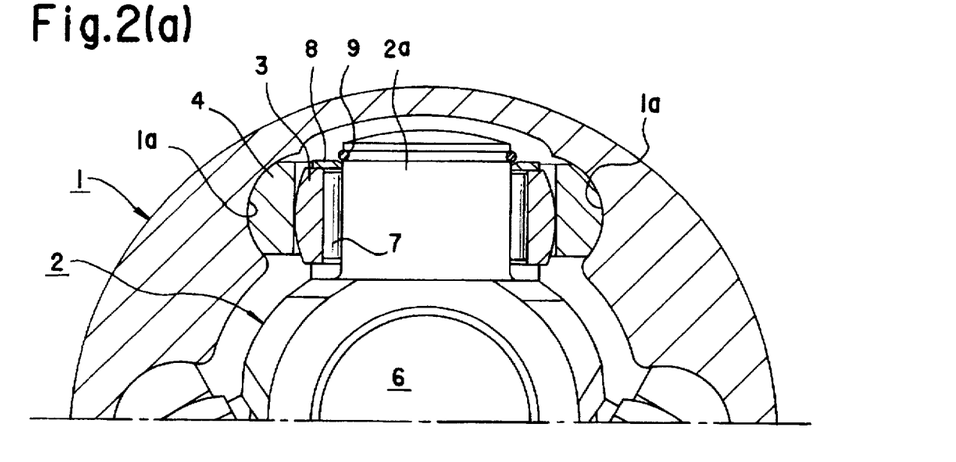
FIG. 2a is a cross-sectional view showing another embodiment.
Figure 2B:
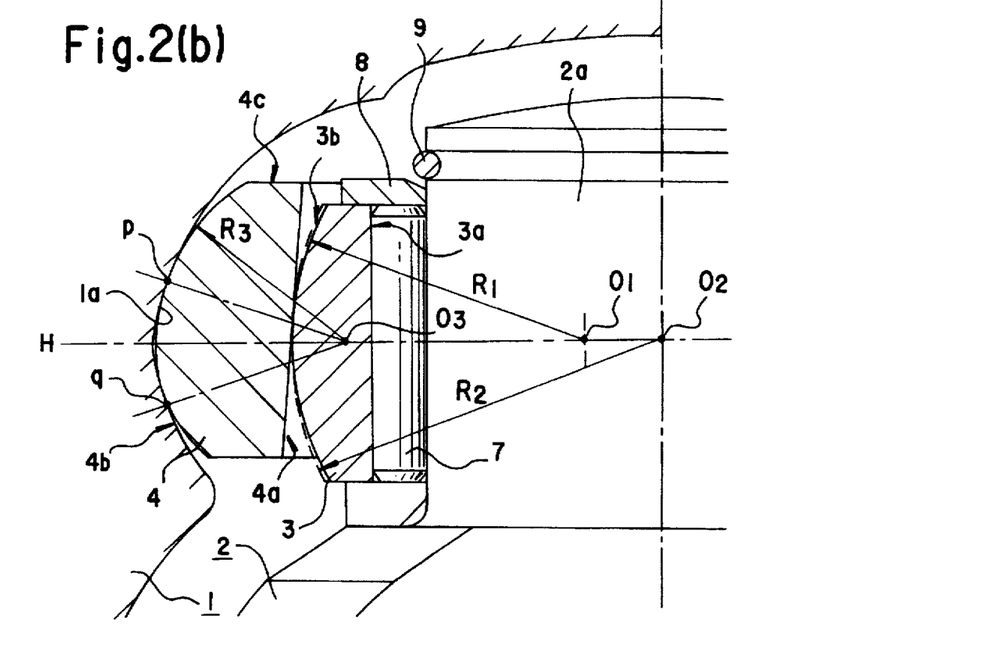
FIG. 2(b) is and a partial enlarged cross-sectional view showing a peripheral portion of a track groove in the FIG. 2(a)

In a homokinetic universal Joint shown in FIG. 2, the portion of the outer roller 4 associated with the distal end of the trunnion is axially larger then the portion closer to an axis of the shaft. The outer surface 4b of the outer roller 4 is asymmetrical with respect to the axial positioning of the spherical surface center 03 thereof. That is, while the spherical surface center 03 is in the plane H including the center 01 and 02, the actual center of the outer roller 4 itself is offset facially outwardly to the distal end of the trunnion. Since there is no flange in the outer side of the track groove 1a of the outer ring 1, the track groove 1a does not contact the end surface 4c of the outer roller 4 associated with the distal end of the trunnion even if the portion of the outer roller 4 associated with the distal end of the trunnion is widthwise expanded. The rest of the arrangement is the same as that shown in FIG. 1.

With the above arrangement, in the homokinetic universal joint according to this embodiment also, the induced thrust is decreased in the same manner as described in the above (1), (2) and (3), and at the same time, the portion of the outer roller 4 associated with the distal end of the trunnion is axially expanded; therefore, when the outer roller 4 axially moves along the track groove 1a while taking an operating angle, the inclination of the outer roller 4 is suppressed which is produced when the outer roller 4 tends to incline as it follows the movement of the inner roller 3. Thus, the decrease of the induced thrust is further effectively attained.

Figure 7:
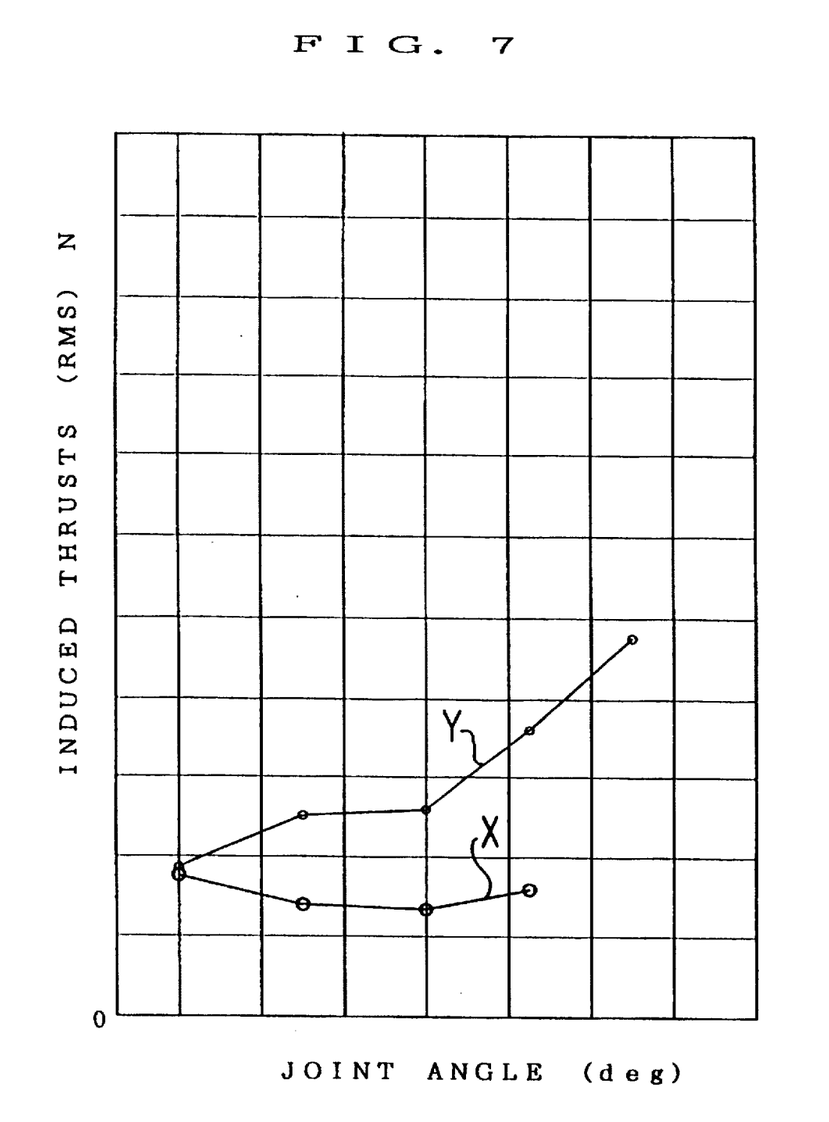
FIG. 7 is a graph showing the results of measurements of the induced thrust.

Induced thrusts were measured on the homokinetic universal joint in the embodiment shown in FIG. 2 and the conventional joint shown in FIGS. 8 and 9. The result is shown in FIG. 7. In FIG. 7, the line X indicates the present inventive article and the line Y indicates a conventional article. As shown in the same figure, the conventional article Y exhibited that the induced thrust increased with increasing joint angle (operating angle) and that it tended to sharply increase particularly from the time when the joint angle reached a predetermined value. In contrast, in the present inventive article X, the induced thrust maintained a substantially constant low level, without any tendency to increase sharply in connection with the joint angle.

Homokinetic universal joints shown in FIGS. 3 through 6 are the same in basic arrangement as the one shown in FIG. 2 and have their induced thrusts decreased in the same manner as mentioned in (1), (2), (3) and (4) above, but differ in the shape of the inner surface 4a of the outer roller 4 from the arrangement shown in FIG. 2.

Figure 3:
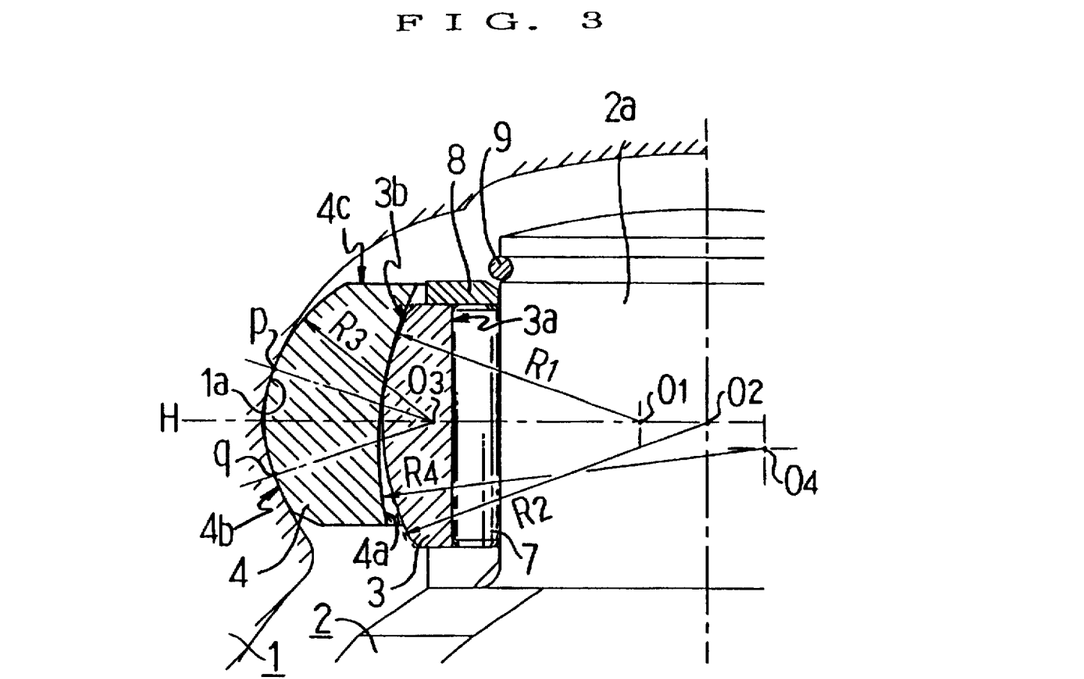
FIG. 3 is a partial enlarged cross-sectional view showing a peripheral portion of a track groove in another embodiment.

The homokinetic universal joint shown in FIG. 3 is designed such that the inner surface 4a of the outer roller 4 is a concave surface of generatrix radius R4 with the generatrix center located at a point 04 which is offset toward the outer diameter side beyond the radius center 02 of the outer surface 3b of the inner roller 3 and toward the proximal end of the trunnion 2a with respect to the generatric center 01 of the outer surface 3b of the inner roller 3. Since the inner surface 4a of the outer roller 4 is such a concave surface, (2) a component of force F is produced in the area of contact S between the inner surface 4a and the outer surface 3b of the inner roller 3, pressing the outer roller 4 toward the distal end of the trunnion.

Figure 4:
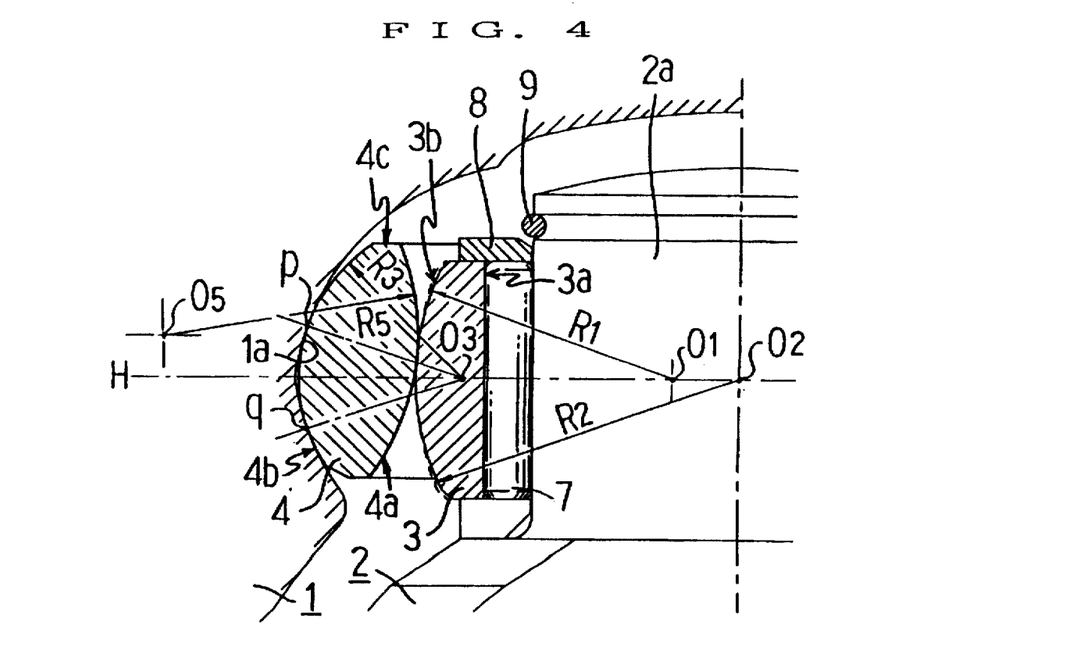
FIG. 4 is a partial enlarged cross-sectional view showing a peripheral portion of a track groove in another embodiment.

The homokinetic universal joint shown in FIG. 4 is designed such that the inner surface 4a of the outer roller 4 is a convex surface of generatrix radius R5 with the generatrix center located at a point 05 which is offset toward the outer diameter side beyond the outer surface 4b of the outer roller 4 and toward the distal end of the trunnion 2a with respect to the generatric center 01 of the outer surface 3b of the inner roller 3. Since the inner surface 4a of the outer roller 4 is such a convex surface, (2) a component of force F is produced in the area of contact S between the inner surface 4a and the outer surface 3b of the inner roller 3, pressing the outer roller 4 toward the distal end of the trunnion.

Figure 5:
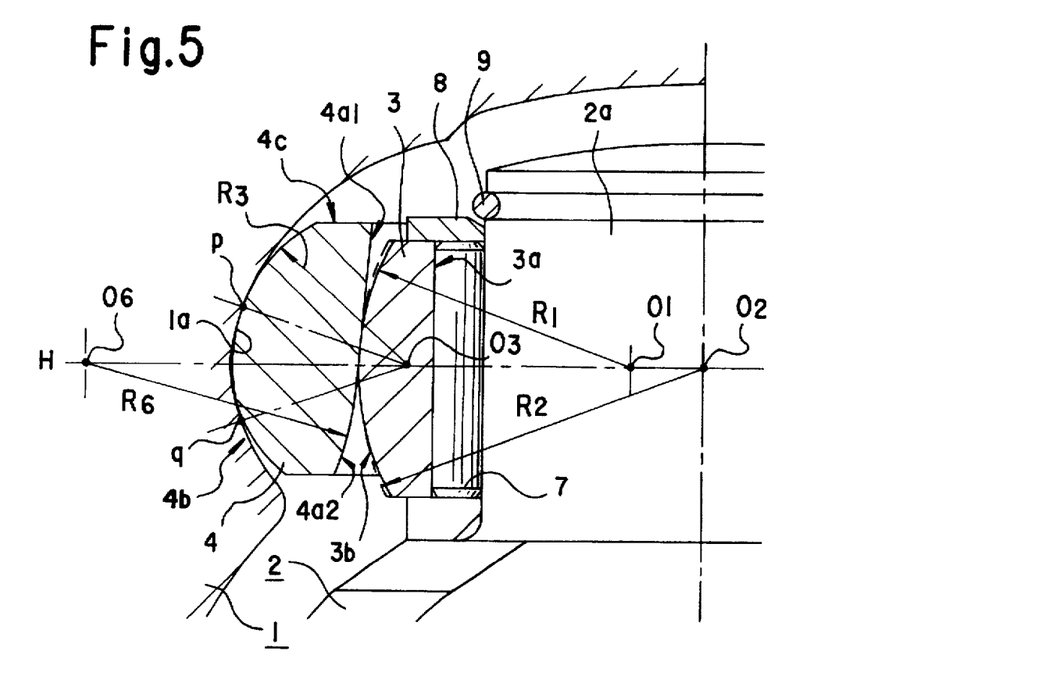
FIG. 5 is a partial enlarged cross-sectional view showing a peripheral portion of a track groove in another embodiment.

The homokinetic universal joint shown in FIG. 5 is designed such that the inner surface 4a of the outer roller 4 is a composite surface comprising a conical taper surface 4a1 gradually decreased in diameter toward the distal end of the trunnion 2a and a partial convex surface 4a2 with the generatrix center located at a point 06 which is offset toward the outer diameter side beyond the outer surface 4b of the outer roller 4 with respect to the generatrix center 01 of the outer surface 3b of the inner roller 3. The conical taper surface 4a1 is positioned on the side associated with the distal end of the trunnion 2a and the partial convex surface 4a2 is positioned on the side associated with the proximal end of the trunnion 2a, the two surfaces being smoothly continuous with each other. Since the inner surface 4a of the outer roller 4 is such a composite surface, (2) a component of force F is produced in the area of contact S between the inner surface 4a and the outer surface 3b of the inner roller 3, pressing the outer roller 4 toward the distal end of the trunnion.

Figure 6:
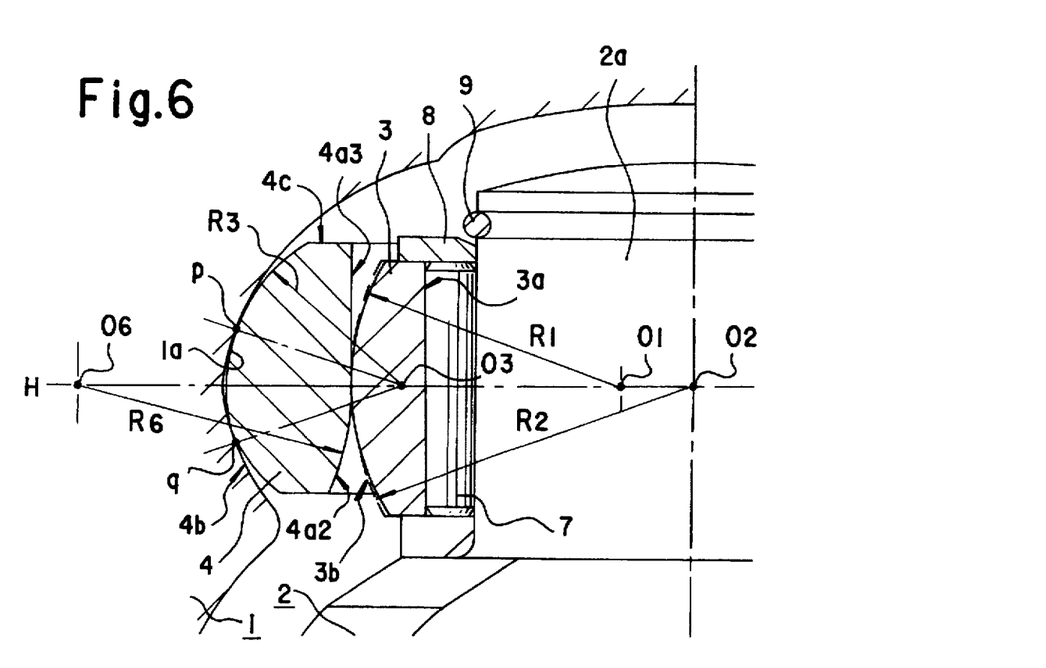
FIG. 6 is a partial enlarged cross-sectional view showing a peripheral portion of a track groove in another embodiment.

The homokinetic universal Joint shown in FIG. 6 is designed such that the inner surface 4a of the outer roller 4 is a composite surface comprising a cylindrical surface 4a3 and a partial convex surface 4a2 with the generatrix center located at a point 06 which is offset toward the outer diameter side beyond the outer surface 4b of the outer roller 4 with respect to the generatrix center 01 of the outer surface 3b of the inner roller 3. The cylindrical surface 4a3 is positioned on the side associated with the distal end of the trunnion 2a and the partial convex surface 4a2 is positioned on the side associated with the proximal end of the trunnion 2a, the two surfaces being smoothly continuous with each other. Since the inner surface 4a of the outer roller 4 is such a composite surface, (2) a component of force F is produced in the area of contact S between the inner surface 4a and the outer surface 3b of the inner roller 3, pressing the outer roller 4 toward the distal end of the trunnion 2a.

In addition, the embodiment shown in FIG. 1 is designed to decrease the induced thrust by combining the elements (1), (2) and (3) mentioned above, while the embodiments shown in FIGS. 2 through 6 are designed to decrease the induced thrust by combining the elements (1), (2), (3) and (4). However, it is possible to construct arrangements by using said elements (1), (2), (3) and (4) singly or in combination, in which case also substantial effects can be expected. Further, the shape of the inner surface 4a of the outer roller 4 may also be applied to the arrangement shown in FIG. 1, in which case also equivalent effects can be expected.

As has been described so far, according to the present invention, the induced thrust which is produced during transmission of torque while the outer ring and the tripod member are taking an operating angle can be greatly decreased as compared with the conventional arrangement, making it possible to improve the vibration characteristics of this tripod type of homokinetic universal Joints.

What is claimed is:

1. A homokinetic universal joint comprising an outer ring having three axial track grooves formed in an inner periphery thereof, and a tripod member having three radially projecting trunnions, each trunnion having rotatably fitted thereon an inner roller having a spherical outer surface and an outer roller having a spherical outer surface and an inner surface in circumferential linear contact with the outer surface of the inner roller in an area of contact therebetween, said tripod member being received in the inner periphery of the outer ring, the outer rollers of the tripod member being rollingly mounted in the track grooves in the outer ring, wherein the inner surface of each outer roller and the outer surface of each inner roller are shaped such that a load component towards a distal end of the trunnion is produced in the area of contact of the inner surface of the outer roller with the outer surface of the inner roller.

2. A homokinetic universal joint as set forth in claim 1, wherein the inner surface of said outer roller in said area of contact is a conical taper surface gradually decreasing in diameter in a direction toward the distal end of the trunnion.

3. A homokinetic universal joint as set forth in claim 1, wherein the inner surface of said outer roller is a concave surface having a generatrix center located at a point offset away from the distal end of the trunnion with respect to a generatrix center of the spherical outer surface of the inner roller.

4. A homokinetic universal joint as set forth in claim 1, wherein the inner surface of said outer roller is a convex surface having a generatrix center located at a point offset toward the distal end of the trunnion with respect to a generatrix center of the spherical outer surface of the inner roller.

5. A homokinetic universal joint as set forth in claim 1, wherein the inner surface of said outer roller is a composite surface in said area of contact comprising one portion having convex surface and another portion having a conical taper surface gradually decreased in diameter toward the distal end of the trunnion.

6. A homokinetic universal joint as set forth in claim 1, wherein the inner surface of said outer roller is a composite surface comprising cylindrical surface in a portion toward the distal end of the trunnion and a single convex in the remaining portion.

7. A homokinetic universal joint comprising an outer ring having three axial track grooves formed in an inner periphery thereof, and a tripod member having three radially projecting trunnions, each trunnion having rotatably fitted thereon an inner roller having a spherical outer surface and an outer roller having a spherical outer surface and an inner surface in linear contact with the outer surface of the inner roller, said tripod member being received in the inner periphery of the outer ring, the outer rollers of the tripod member being rollingly mounted in the track grooves in the outer ring, wherein a generatrix radius of the outer surface of the inner roller is smaller than a maximum radius of said outer surface of the inner roller.

8. A homokinetic universal joint comprising an outer ring having three axial track grooves formed in an inner periphery thereof, and a tripod member having three radially projecting trunnions, each trunnion having rotatably fitted thereon an inner roller having a spherical outer surface and an outer roller having a spherical outer surface and an inner surface in circumferential linear contact with the outer surface of the inner roller in an area of contact therebetween, said tripod member being received in the inner periphery of the outer ring, the outer rollers of the tripod member being rollingly mounted in the track grooves in the outer ring, wherein the track grooves of the outer ring contact the outer surfaces of the outer rollers but do not contact end surfaces of the outer rollers associated distal ends of the trunnions; and the inner surface of each outer roller and the outer surface of each inner roller are shaped such that a load component towards a distal end of the trunnion is produced in the area of contact of the inner surface of the outer roller with the outer surface of the inner roller.

9. A homokinetic universal joint comprising an outer ring having three axial track grooves formed in an inner periphery thereof, and a tripod member having three radially projecting trunnions, each trunnion having rotatably fitted thereon an inner roller having a spherical outer surface and an outer roller having a spherical outer surface and an inner surface in linear contact with the outer surface of the inner roller, said tripod member being received in the inner periphery of the outer ring, the outer rollers of the tripod member being rollingly mounted in the track grooves in the outer ring, wherein a portion of the outer roller associated with a distal end of the trunnion is axially larger than a portion associated with a proximal end of the trunnion, so that the outer roller is axially asymmetrical with respect to a plane defined at a right angle to an axis of the trunnion and including the spherical surface center of said outer surface of said outer roller.

* * * * *